Patented Jan. 26, 1954

2,667,413

UNITED STATES PATENT OFFICE 2,667,413

VAPOR-PHASE SMELTING PROCESS

James Fernando Jordan, Huntington Park, Calif.

No Drawing. Application January 15, 1951,
Serial No. 206,115

4 Claims. (Cl. 75—84)

My invention relates to metallurgy wherein it is desirable to form an ingot of and from metal particles being produced by the reduction of a halide of said metal.

Processes involving the reduction of titanium tetrachloride with magnesium result in the production of a reaction mass consisting of titanium sponge, magnesium, and magnesium chloride. This reaction mass must then be subjected to a series of processes in order to recover the metallic titanium content of said mass as an ingot of titanium.

My invention concerns my method of separating the products of said reaction so as to form a titanium ingot as a direct product from the reduction process. In my process, I carry out the reaction by dispersing the reactants within an inert reaction media that is maintaining at a temperature that lies above the melting point of titanium, so that the titanium particles produced within said media by said reaction will settle thru said media to collect and form a pool of molten titanium at the base of said media, said titanium ingot being formed by periodically or continuously solidifying said molten titanium of said pool.

An inert reaction media consists of a pool of molten salt, said salt consisting of one or more salts which, taken together, form a molten pool that is substantially non-volatile at the operation temperature, said pool being substantially inert towards the reactants and resultants of the reaction being entertained therein. The molten reaction media may be maintained at temperature by any suitable means. If the reaction being entertained within the media is strongly exothermic, then the heat of the reaction may be sufficient to maintain the media at the required temperature—the required temperature being always a temperature that lies above the melting point of the metal being produced by the reaction. If the reaction is not sufficiently exothermic to supply the required heat, or if the reaction is endothermic, the required heat may be supplied to the reaction media by inductive or other electrical methods. The mentioned reaction between titanium tetrachloride and magnesium is strongly exothermic, and, accordingly, if the reaction vessel is adequately insulated, this reaction should be capable of supplying the required heat. In reactions involving other titanium halides or other reducing agents or involving the halides of other metals, outside heat may have to be furnished to the molten media so that said media is maintained at a temperature above the melting point of the metal being produced. While the shape and size of the pool of molten reaction media may be any convenient form, I prefer a molten media consisting of a column of molten media, so as to facilitate the operation of the process.

The reactants should be separately introduced into and dispersed within the molten media so that contact and reaction therebetween is facilitated as the gaseous reactants rise up thru said media—gaseous, that is, when magnesium is being reacted with titanium tetrachloride. While it is for convenience assumed that gaseous titanium tetrachloride is insoluble in most molten media consisting of the available inert salts—to be discussed later—the actual reaction mechanism may involve, first, the solution of the tetrachloride in the molten media, followed by a reaction between gaseous magnesium and the dissolved titanium compound; or the tetrachloride may first be reduced to a lower chloride by either magnesium or titanium or both, the resulting lower chloride being thereupon dissolved in the molten media to be further reduced to titanium metal upon further contact with magnesium; however, whatever the reaction mechanism may be, the result will always be substantially the same—that is, a dispersion of precipitated metal particles within the molten media. In view of the fact that a reaction media may act as a solvent for the halide being reduced, or as a solvent for an intermediate halide, before the reduction process actually yields the desired metallic form, by inert media I do not bar the use of such molten salt media as might enter into the reaction in such a manner, and, accordingly, by inert I mean inert in the sense that the media should not prevent the desired reaction from taking place therewithin.

I prefer to so operate my process so that an excess of the metallic reducing agent is being employed, so as to thereby drive the reaction to completion, the excess reducing agent being recovered by collecting and condensing the gaseous reducing agent emerging from the pool of molten media. While the halide(s) being reduced by my process may be gaseous, liquid or solid at the temperature of the operation, the reducing agent of my process is gaseous, and, accordingly, the pool of molten media must be maintained at a temperature that lies above the boiling point of said reducing agent. As reducing agents in my process I may employ magnesium, sodium and/or potassium. Thus, in a reaction involving the reduction of titanium tetrachloride with magnesium, I maintain the molten media at a temperature that lies above the melting point of titanium and the boiling point of magnesium.

When the halide of the reducing agent being produced in the process possesses a lower boiling point than the operational temperature, then said halide will pass off as a gas. Thus, in the aforementioned reaction wherein magnesium chloride is being produced in a reaction between magnesium and the chlorides of titanium, said magnesium chloride will emerge from the inert reaction media as a gas, and said magnesium chloride may be recovered by condensation procedures.

In general, calcium fluoride, calcium chloride and magnesium fluoride are suitable salts for forming an inert media according to my process.

While I have discussed the use of my process to produce titanium, the other elements of group IVB may also be produced by the process. Thus, my process may be employed to produce titanium, zirconium, thorium or hafnium.

The ingot produced by my process may be round, oval, square, rectangular, or any other convenient shape, and the shape and size of the cross section of the pool or column of molten reaction media may be substantally the same as, or substantially different from, the cross section of the ingot being produced.

The ingot of my process is formed by allowing the molten pool of metal to solidify at the base of the pool of reaction media, said molten pool of metal having been accumulated as particles of said metal, precipitated within said media by said reaction, contact and consolidate with said pool of molten metal. The ingot may be formed by periodically allowing the molten reaction media to cool to a temperature that lies below the melting point of the metal being formed, or said ingot may be formed by continuously withdrawing the solidified ingot out thru a water-cooled opening in the bottom of the reaction vessel that contains my process, in the manner conventional with continuous ingoting practices.

My process may be caused to yield an ingot consisting of an alloy of two or more metals. Thus, by employing the reducing agent to reduce a mixture of, say, titanium chloride and chromium chloride, a titanium-chromium alloy ingot may be produced. Other alloys producible from such halide mixtures will occur to those skilled in metallurgy. An alloy ingot may also be produced by feeding the alloy metal(s) directly into the reaction media so that the addition metal(s) will settle thru said media to contact and alloy with the pool of molten metal lying at the base of the media pool.

Titanium, for example, may be produced by my process by reacting a mixture of different titanium halides with the gaseous reducing agent; thus, such a mixture may be formed by reacting iodine with titanium dichloride or trichloride to form titanium tetrachloride and titanium tetraiodide which is then fed into my reaction media.

Having now described several forms of my invention, I wish it to be understood that I do not restrict my invention to the specific form or arrangement of steps hereinbefore disclosed, except insofar as such restrictions are specified in the appended claims.

I claim as my invention:

1. In the process wherein titanium is produced by reacting a chloride of titanium with a reducing agent selected from the group consisting of magnesium, potassium and sodium to form titanium and a chloride of said reducing agent, the method of separating said titanium from said reducing agent chloride, which comprises: melting at least one halide selected from the group consisting of calcium fluoride, calcium chloride and magnesium fluoride to form a molten pool of said halide, said halide having a boiling point that lies above the melting point of titanium and above the boiling point of said reducing agent chloride; heating said molten halide pool to a temperature that lies in the range between the melting point of titanium and the boiling point of said molten halide pool, said temperature being above the boiling point of said reducing agent chloride; mixing said chloride of titanium with said reducing agent within said molten halide pool so that reaction between said titanium chloride and said reducing agent within said molten halide pool yields molten particles of titanium dispersed within and collected by said molten halide pool, the reducing agent chloride formed in said reaction being separated from said collected titanium particles by withdrawing said reducing agent chloride in vapor phase from said molten halide pool; and floating said molten halide pool containing said titanium particles on a molten pool of titanium, said molten titanium pool being formed as said titanium particles settle through said molten halide pool to collect at the base of said molten halide pool, the temperature of said molten halide pool and said molten titanium pool being maintained within said range with the aid of heat released by said reaction.

2. The process according to claim 1 in which said molten titanium pool is contained within a continuous mold and in which a portion of said molten titanium pool is continuously solidified to form a continuous cast shape.

3. The process according to claim 1 in which the metal of said molten titanium pool consists of an alloy of titanium with at least one other element and in which said other element is introduced into said process by reacting said reducing agent with a chloride mixture within said molten halide pool, said chloride mixture consisting of a chloride of titanium and a chloride of said other element.

4. The process according to claim 1 in which the metal of said molten titanium pool consists of an alloy of titanium with at least one other element and in which said other element is introduced into said process by forming said other element separately from said process and then introducing said other element in finely-divided form into said molten halide pool, so that said other element settles through said molten halide pool to collect and form an alloy with said molten titanium pool.

JAMES FERNANDO JORDAN.

References Cited in the file of this patent

UNITED STATES PATENTS

| Number | Name | Date |
|---|---|---|
| 1,306,568 | Weintraub | June 10, 1919 |
| 2,091,087 | Wempe | Aug. 24, 1937 |
| 2,148,345 | Freudenberg | Feb. 21, 1939 |
| 2,205,854 | Kroll | June 25, 1940 |
| 2,486,475 | Kawecki | Nov. 1, 1949 |
| 2,541,764 | Herres et al. | Feb. 13, 1951 |
| 2,564,337 | Maddex | Aug. 14, 1951 |
| 2,607,674 | Winter, Jr. | Aug. 19, 1952 |

OTHER REFERENCES

Handbook of Chemistry and Physics, 28th Ed., 1944, published by Chemical Rubber Publishing Co., Cleveland, Ohio. Pages 348, 349, 406 and 407.

Journal of Metals, April 1950. Pages 634–640.